United States Patent Office 3,506,743
Patented Apr. 14, 1970

3,506,743
NOVEL O,O-DIALKYL-O-(CARBOXY-ALKENYL)-PHOSPHORIC ACID COMPOUNDS
Wolfgang Buck, Richard Sehring, and Karl Zeile, Ingelheim (Rhine), Germany, assignors to C. H. Boehringer Sohn, Ingelheim (Rhine), Germany, a limited partnership of Germany
No Drawing. Filed Apr. 6, 1967, Ser. No. 632,506
Claims priority, application Germany, Apr. 7, 1966, B 86,592; Nov. 25, 1966, B 90,016
Int. Cl. C07f 9/08; C07d 29/24, 87/36
U.S. Cl. 260—942        6 Claims

ABSTRACT OF THE DISCLOSURE

The compounds are novel derivatives of O,O-dialkyl-O-(carboxy-alkenyl)-phosphoric acid useful as insecticidal and acaricidal agents with low toxicity toward warm-blooded animals and low volatility.

---

This invention relates to novel O,O-dialkyl-O-(carboxyalkenyl)-phosphoric acid compounds as well as to a process of preparing such compounds.

More particularly, the present invention concerns a novel class of phosphoric acid derivatives of the formula

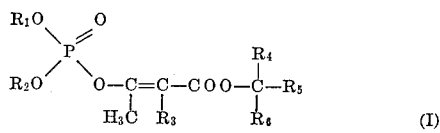

(I)

wherein $R_1$ and $R_2$, which may be identical to or different from each other, are alkyl of 1 to 4 carbon atoms, $R_3$ is hydrogen, chlorine or bromine, $R_4$ is hydrogen or methyl, $R_5$ is cyano, —COOR$_7$ or

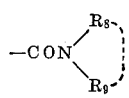

where $R_7$ is alkyl of 1 to 6 carbon atoms, and $R_8$ and $R_9$, which may be identical to or different from each other, are hydrogen, straight or branched alkyl of 1 to 6 carbon atoms, cycloalkyl of up to 6 carbon atoms, aryl or aralkyl or, together with each other and the nitrogen atom to which they are attached, form a basic heterocyclic ring, such as morpholino or piperidino, and $R_6$ is hydrogen or, if $R_5$ is cyano, lower alkyl.

The compounds according to the present invention may be prepared by a process which involves well known chemical principles, that is, by reacting an acetoacetylhydroxy carboxylic acid derivative of the Formula II with a trialkyl phosphite of the Formula III at elevated temperatures, pursuant to the following reaction equation:

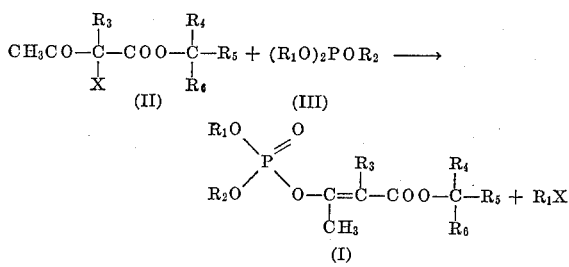

wherein X is chlorine or bromine and $R_1$ through $R_6$ have the same meanings as in Formula I. If $R_1$ and $R_2$ are alkyl of a different number of carbon atoms, then $R_1$ designates the one with a lesser number of carbon atoms.

The reaction between compounds II and III may be carried out with or without a solvent medium. In the event that no solvent is used, the reaction often begins already at room temperature after the reactants have been admixed with each other, which is evidenced by a clearly noticeable increase in the internal temperature of the reaction mixture, and is brought to completion by heating the mixture, preferably to 80–120° C.

If the reaction is carried out in the presence of a solvent, it is preferred to use an inert organic solvent such as benzene, toluene, xylene, chlorobenzene or dioxane, chlorobenzene being particularly preferred. Under these conditions the reaction mixture is held for one to three hours at preferably 80–120° C., and the trialkyl phosphite III is provided in an amount slightly in excess of the amount stoichiometrically required for reaction with starting compound II. The progress of the reaction may be followed by condensing and weighing the alkyl halide $R_1X$ formed by the reaction; in general, it goes to completion after one to three hours. Thereafter, the solvent and the excess unreacted trialkyl phosphite are removed by vacuum distillation, and the reaction product remains as a colorless to reddish-brown oily residue.

Those raw reaction products of the Formula I wherein $R_5$ is cyano or —COOR$_7$ may be purified by fractional vacuum distillation. The raw reaction products of the Formula I wherein $R_5$ is —CONR$_8R_9$ are water-soluble and may be adequately purified by dissolving them in water, treating the solution with activated charcoal, and extracting the purified product with methylenechloride. They cannot be distilled without decomposition at 0.1 mm. Hg.

A starting compound of the Formula II may be obtained by reacting a hydroxy-carboxylic acid of the formula

(IV)

wherein $R_4$, $R_5$ and $R_6$ have the same meanings as in Formula I, with diketene, or by double ester decomposition of methyl or ethyl acetate with an amide or nitrile of the Formula IV, followed by chlorination or bromination. The chlorination may readily be accomplished with one or two molar equivalents of sulfuryl chloride.

The following examples further illustrate the instant invention and will enable others skilled in the art to understand it more completely. It should be understood, however, that the invention is not limited solely to the particular examples given below.

EXAMPLE 1

Preparation of O,O-dimethyl-O-[1-(ethoxycarbonylmethoxycarbonyl)-1-propen-2-yl]-phosphate 22.3 gm. (0.1 mol) of 2-chloroacetoacetyl-glycolic acid ethyl ester were added dropwise, while stirring, to a boiling solution of 14.9 gm. (0.12 mol) of trimethyl-phosphite in 30 cc. of chlorobenzene in a three-neck flask provided with a stirrer, dropping funnel and reflux cooler, the latter, in turn, being connected to a cooled condenser trap. Thereafter, the reaction solution was refluxed for another hour. At the end of this time 3.5 gm. of methyl chloride had collected (calculated amount: 5.05 gm.; a portion remained in the apparatus). The chlorobenzene and the excess unreacted trimethyl phosphite were then distilled off in vacuo on a boiling water bath. 27.8 gm. of a yellow oil remained behind, which were purified by vacuum distillation. 23.6 gm. (79.5% of theory) of a colorless liquid, B.P. 142–143° C. at 0.01 mm. Hg, were obtained. It was identified to be O,O-dimethyl-O-[1-(ethoxycarbonylmethoxycarbonyl)-1-penten-2-yl]-phosphate of the formula

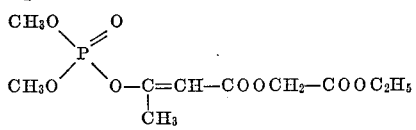

*Analysis* (mol. wt. 296.2).—Calculated: P, 10.48%. Found: P, 10.50%.

EXAMPLE 2

Using a procedure analogous to that described in Example 1, O,O-dimethyl-O-[1-(ethoxycarbonyl-ethoxycarbonyl)-1-propen-2-yl]-phosphate, B.P. 138–140° C. at 0.005 mm. Hg, of the formula

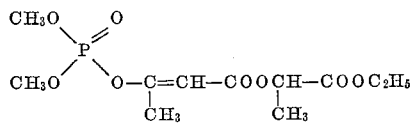

was prepared from trimethylphosphite and 2-chloroacetoacetyl-lactic acid ethyl ester. The yield was 86% of theory.

EXAMPLE 3

Using a procedure analogous to that described in Example 1, O,O-diethyl-O-[1-methoxycarbonyl-ethoxycarbonyl)-1-propen-2-yl]-phosphate, B.P. 145–152° C. at 0.2 mm. Hg, of the formula

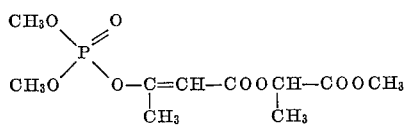

was prepared from trimethylphosphite and 2-chloroacetoacetyl-lactic acid mehtyl ester. The yield was 94.4 of theory.

EXAMPLE 4

Using a procedure analogous to that described in Example 1, O,O-dimethyl-O-[1-methoxycarbonyl-ethoxycarbonyl)-2-propen-2-yl-phosphate, B.P. 140° C. at 0.01 mm. Hg, of the formula

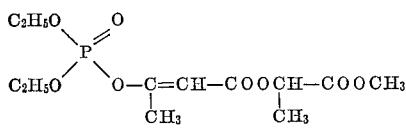

was prepared from triethylphosphite and 2-chloroacetoacetyl-lactic acid methyl ester. The yield was 77.2% of theory.

EXAMPLE 5

Using a procedure analogous to that described in Example 1, O,O-dimethyl - O - [1 - (ethoxycarbonyl - methoxycarbonyl)-1-chloro-1-propen-2-yl] - phosphate, B.P. 160–162° C. at 0.01 mm. Hg, of the formula

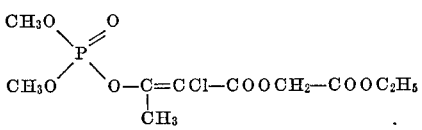

was prepared from trimethylphosphite and 2,2-dichloroacetoacetyl-glycolic acid ethyl ester. The yield was 85.5% of theory.

EXAMPLE 6

Using a procedure analogous to that described in Example 1, O,O - diethyl - O - [1-(ethoxycarbonyl-ethoxycarbonyl)-1-propen-2-yl]-phosphate, B.P. 142–145° C. at 0.01 mm. Hg, of the formula

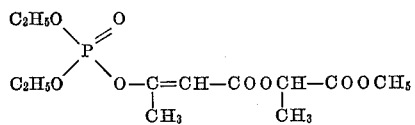

was prepared from triethylphosphite and 2-chloroacetoacetyl-lactic acid ethyl ester. The yield was 80.5% of theory.

EXAMPLE 7

Using a procedure analogous to that described in Example 1, O,O-dimethyl-O-[1-(methoxycarbonyl-ethoxycarbonyl)-1-chloro-1-propen-2-yl]-phosphate, B.P. 158–160° C. at 0.03 mm. Hg, of the formula

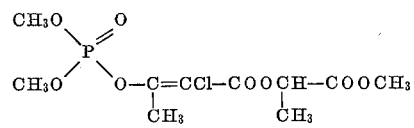

was prepared from trimethylphosphite and 2,2-dichloroacetoacetyl-lactic acid methyl ester. The yield was 88.5% of theory.

EXAMPLE 8

Using a procedure analogous to that described in Example 1, O,O-diethyl-O - [1-(methoxycarbonyl-ethoxycarbonyl) - 1 - chloro-1-propen-2yl]-phosphate, B.P. 155–160° C. at 0.02 mm. Hg, of the formula

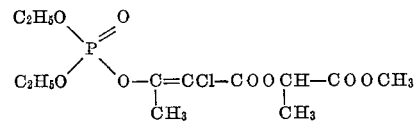

was prepared from triethylphosphite and 2,2 - dichloroacetoacetyl-lactic acid methyl ester. The yield was 89.2% of theory.

EXAMPLE 9

Using a procedure analogous to that described in Example 1, O,O-dimethyl-O-[1-(n-butoxycarbonyl-methoxycarbonyl)-1-propen-2-yl]-phosphate, B.P. 160–165° C. at 0.01 mm. Hg, of the formula

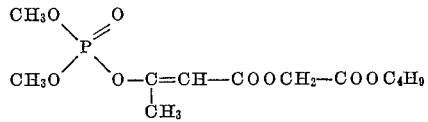

was prepared from trimethylphosphite and 2-chloroacetoacetyl-glycolic acid n-butyl ester. The yield was 90.4% of theory.

EXAMPLE 10

Using a procedure analogous to that described in Example 1, O,O-diethyl-O - [1-(n-butoxycarbonyl-methoxycarbonyl)-1-propen-2-yl]-phosphate, B.P. 163–166° C. at 0.005 mm. Hg, of the formula

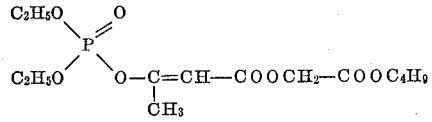

was prepared from triethylphosphite and 2-chloroacetyl--glycolic acid n-butyl ester. The yield was 87.2% of theory.

EXAMPLE 11

Preparation of O,O-dimethyl-O - [1-(n-butoxycarbonylmethoxy - carbonyl) - 1-chloro - 1-propen-2-yl]-phosphate without solvent medium 14.8 gm. (0.12 mol) of trimethylphosphite were added dropwise over a period of 15 minutes to 28.5 gm. (0.1 mol) of 2,2-dichloroacetoacetyl-glycolic acid n-butyl ester (B.P. 116–117° C. at 0.03 mm Hg), accompanied by stirring, whereby the internal temperature of the reaction mixture rose to 40° C. After all of the trimethyl phosphite had been added, the reaction mixture was stirred for one and a half hours at 90° C. on a water bath. Thereafter, the excess unreacted trimethyl phosphite was distilled off in vacuo, leaving 34.5 gm. of a yellow oil as a residue, which was purified by fractional vacuum distillation. The fraction passing over between 165 and 168° C. at 0.15 mm. Hg was collected. 27 gm. (75% of theory) of a colorless viscous liquid was obtained, which was identified to be O,O-dimethyl-O - [1-(butoxycarbonyl-methoxycarbonyl)-1-chloro-propen-2-yl]-phosphate, mol. wt. 358.7, of the formula $$\begin{array}{c} CH_3O \\ CH_3O \end{array} \!\!\!\! \diagup\!\!\!\!\!\!\!\diagdown \!\!\!\! \begin{array}{c} O \\ O-C=CCl-COOCH_2-COOC_4H_9 \\ | \\ CH_3 \end{array}$$

EXAMPLE 12

Using a procedure analogous to that described in Example 11, O,O - dimethyl-O - [1-(isopropoxycarbonyl-ethoxycarbonyl) - 1-propen-2-yl]-phosphate, B.P. 160–165° C. at 1 mm. Hg, of the formula $$\begin{array}{c} CH_3O \\ CH_3O \end{array} \!\!\!\! \diagup\!\!\!\!\!\!\!\diagdown \!\!\!\! \begin{array}{c} O \\ O-C=CH-COOCH-COOCH(CH_3)_2 \\ | \qquad\qquad | \\ CH_3 \qquad\qquad CH_3 \end{array}$$

was prepared from trimethyl phosphite and 2-chloroacetoacetyl - lactic acid isopropyl ester. The yield was 93.7% of theory.

EXAMPLE 13

Using a procedure analogous to that described in Example 11, O,O-diethyl-O-[1-(isopropoxycarbonyl-ethoxycarbonyl)-1-propen-2-yl]-phosphate, B.P. 158–161° C. at 0.3–0.7 mm. Hg, of the formula $$\begin{array}{c} C_2H_5O \\ C_2H_5O \end{array} \!\!\!\! \diagup\!\!\!\!\!\!\!\diagdown \!\!\!\! \begin{array}{c} O \\ O-C=CH-COOCH-COOCH(CH_3)_2 \\ | \qquad\qquad | \\ CH_3 \qquad\qquad CH_3 \end{array}$$

was prepared from triethyl phosphite and 2-chloroaceto- of theory.

EXAMPLE 14

Using a procedure analogous to that described in Example 11, O,O-dimethyl-O - [1-(ethoxycarbonyl-ethoxycarbonyl-1-bromo-1-propen-2-yl] - phosphate, B.P. 151–164° C. at 0.05 mm. Hg (decomposition), of the formula $$\begin{array}{c} CH_3O \\ CH_3O \end{array} \!\!\!\! \diagup\!\!\!\!\!\!\!\diagdown \!\!\!\! \begin{array}{c} O \\ O-C=CBr-COOCH-COOC_2H_5 \\ | \\ CH_3 \qquad\qquad CH_3 \end{array}$$

was prepared from trimethyl phosphite and 2,2-dibromo-acetoacetyl-lactic acid ethyl ester. The yield was 61.5% of theory.

EXAMPLE 15

Using a procedure analogous to that described in Example 11, O,O-diethyl-O - [1 - (ethoxycarbonyl-ethoxycarbonyl)-1-bromo-1-propen-2-yl]-phosphate of the formula $$\begin{array}{c} C_2H_5O \\ C_2H_5O \end{array} \!\!\!\! \diagup\!\!\!\!\!\!\!\diagdown \!\!\!\! \begin{array}{c} O \\ O-C=CBr-COOCH-COOC_2H_5 \\ | \qquad\qquad | \\ CH_3 \qquad\qquad CH_3 \end{array}$$

was prepared from triethyl phosphite and 2,2-dibromo-acetoacetyl-lactice acid ethyl ester. The yield of raw product was 97.5% of theory.

EXAMPLE 16

Using a procedure analogous to that described in Example 11, except that a vacuum of about 100 mm. Hg was maintained throughout the reaction period, O,O-di-n-butyl - O - [1 - (methoxycarbonyl-ethoxycarbonyl)-1-propen-2-yl]-phosphate, B.P. 148–150° C. at 0.01 mm. Hg, of the formula $$\begin{array}{c} C_4H_9O \\ C_4H_9O \end{array} \!\!\!\! \diagup\!\!\!\!\!\!\!\diagdown \!\!\!\! \begin{array}{c} O \\ O-C=CH-COOCH-COOCH_3 \\ | \qquad\qquad | \\ CH_3 \qquad\qquad CH_3 \end{array}$$

was prepared from tri-n-butyl phosphite and 2-chloro-acetoacetyl-lactic acid methyl ester. The yield was 67.2% of theory.

EXAMPLE 17

Using a procedure analogous to that described in Example 11, O.O-diisopropyl - O - [1 - (methoxycarbonyl-ethoxy-carbonyl)-1-propen-2-yl]-phosphate, B.P. 137–152° C., of the formula $$\begin{array}{c} (CH_3)_2CHO \\ (CH_3)_2CHO \end{array} \!\!\!\! \diagup\!\!\!\!\!\!\!\diagdown \!\!\!\! \begin{array}{c} O \\ O-C=CH-COOCH-COOCH_3 \\ | \qquad\qquad | \\ CH_3 \qquad\qquad CH_3 \end{array}$$

was prepared from triisopropyl phosphite and 2-chloro-acetoacetyl-lactic acid methyl ester. The yield was 53.2% of theory.

EXAMPLE 18

Preparation of O,O-dimethyl-O-[1-(1-dimethylcarbamyl-ethoxy-carbonyl)-1-propen-2-yl]-phosphate 23.5 gm. (0.1 mol) of 2-chloroacetoacetyl-lactic acid dimethylamide were admixed with 16.1 gm. (0.13 mol) of trimethyl phosphite in a three-neck flask provided with a stirrer, thermometer and reflux cooler, the latter being in turn connected to a cooled condenser trap. The temperature of the mixture rose to about 40° C. The mixture was then stirred for two hours on a boiling water bath. At the end of this time 3 gm. of methylchloride had collected in the trap. The contents of the reaction flask were then charged into a rotary evaporator and allowed to remain therein for thirty minutes at 120° C. under a vacuum of 0.1 mm. Hg in order to remove the unreacted trimethyl phosphite. The residual brown oil was taken up in 200 cc. of water, and the cloudy solution was shaken with gasoline and then treated with activated charcoal. The gasoline phase was discarded, and the clear aqueous phase was extracted several times with methylene chloride. The combined methylene chloride extract solutions were dried over sodium sulfate and then evaporated. 27 gm. (87.2% of theory) of a yellow oil were obtained, which was identified to be O,O-dimethyl-O-[1-(1-dimethylcarbamyl-ethoxycarbonyl)-1-propen-2-yl]-phosphate of the formula $$\begin{array}{c} CH_3O \\ CH_3O \end{array} \!\!\!\! \diagup\!\!\!\!\!\!\!\diagdown \!\!\!\! \begin{array}{c} O \\ O-C=CH-COOCH-CON(CH_3)_2 \\ | \qquad\qquad | \\ CH_3 \qquad\qquad CH_3 \end{array}$$

*Analysis* (mol. wt. 309.2); $n_D^{20}$=1.4770.—Calculated: N, 4.51%; P, 10.0%. Found: N, 4.59%; P, 9.85%.

When a sample of the product was subjected to distillation at 0.1 mm. Hg, it underwent partial decomposition.

EXAMPLE 19

Using a procedure analogous to that described in Example 18, O,O-diethyl-O-[1-(dimethylcarbamyl-ethoxycarbonyl)-1-propen-2-yl]-phosphate, a light brown oil, $n_D^{20}=1.4720$, of the formula

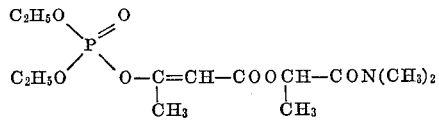

was prepared from triethyl phosphite and 2-chloroacetoacetyl-lactic acid dimethylamide. The yield was 71.8%.

*Analysis.*—Calculated: N, 4.17%. Found: N, 4.33%.

EXAMPLE 20

Using a procedure analogous to that described in Example 18, O,O-dimethyl-O-[1-(methylcarbamyl-ethoxycarbonyl)-1-propen-2-yl]-phosphate, a yellow viscous oil, $n_D^{20}=1.4763$, of the formula

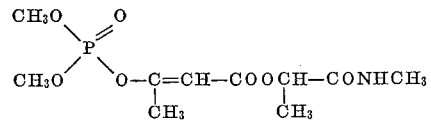

was prepared from trimethyl phosphite and 2-chloroacetoacetyl-lactic acid methylamide. The yield was 83% of theory.

*Analysis.*—Calculated: N, 4.75%. Found: N, 5.00%.

EXAMPLE 21

Using a procedure analogous to that described in Example 18, O,O-diethyl-O-[1-(1-methylcarbamyl-ethoxycarbonyl) - 1 - propen-2-yl]-phosphate, a yellow oil, $n_D^{20}=1.4680$, of the formula

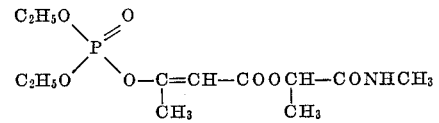

was prepared from triethyl phosphite and 2-chloroacetoacetyl-lactic acid methylamide. The yield was 76.2% of theory.

*Analysis.*—Calculated: N, 4.33%. Found: N, 4.40%.

EXAMPLE 22

Using a procedure analogous to that described in Example 18, O,O - dimethyl-O-[1-(1-dimethylcarbamyl-ethoxy-carbonyl-1-chloro - 1 - propen-2-yl]-phosphate, a brown oil of the formula

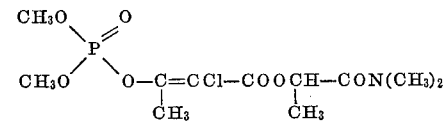

was prepared from trimethyl phosphite and 2,2-dichloroacetoacetyl-lactic acid dimethylamide. The yield was 77.2% of theory.

*Analysis.*—Calculated: N, 4.08%. Found: N, 3.94%.

EXAMPLE 23

Using a procedure analogous to that described in Example 18, O,O-diethyl-O-[1-(1-dimethylcarbamyl-ethoxycarbonyl) - 1 - chloro-1-propen-2-yl]-phosphate, a dark brown oil of the formula

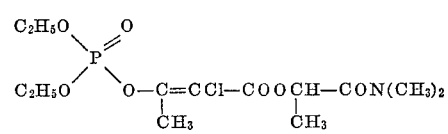

was prepared from triethyl phosphite and 2,2-dichloroacetoacetyl-lactic acid dimethylamide. The yield was 96% of theory.

*Analysis.*—Calculated: N, 3.76%. Found: N, 3.19%.

EXAMPLE 24

Using a procedure analogous to that described in Example 18, O,O-dimethyl-O-[1-(ethylcarbamyl-methoxycarbonyl)-1-propen-2-yl]-phosphate, a brown oil of the formula

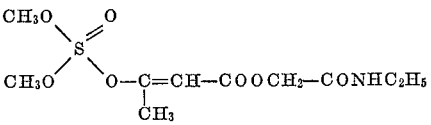

was prepared from trimethyl phosphite and 2-chloroacetoacetyl-glycolic acid ethylamide. The yield was 96.5% of theory.

*Analysis.*—Calculated: N, 4.75%. Found: N, 4.56%.

EXAMPLE 25

Using a procedure analogous to that described in Example 18, O,O-dimethyl-O-[1-(ethylcarbamyl-methoxycarbonyl)-1-chloro-1-propen-2-yl]-phosphate, a brown oil of the formula

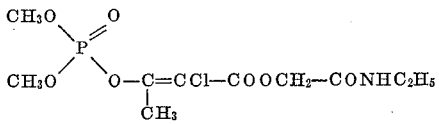

was prepared from trimethyl phosphite and 2,2-dichloroacetoacetyl-glycolic acid ethylamide. The yield was 84.5% of theory.

*Analysis.*—Calculated: N, 4.25%. Found: N, 4.06%.

EXAMPLE 26

Using a procedure analogous to that described in Example 18, O,O-diethyl-O-[1-(ethylcarbamyl-methoxycarbonyl)-1-propen-2-yl]-phosphate, a brown oil of the formula

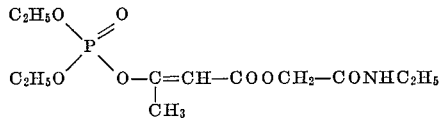

was prepared from triethyl phosphite and 2-chloroacetoacetyl-glycolic acid ethylamide. The yield was 88% of theory.

*Analysis.*—Calculated: N, 4.33%. Found: N, 4.10%.

EXAMPLE 27

Using a procedure analogous to that described in Example 18, O,O-diethyl-O-[1-(ethylcarbamyl-methoxycarbonyl)-1-chloro-1-propen-2-yl]-phosphate, a brown oil of the formula

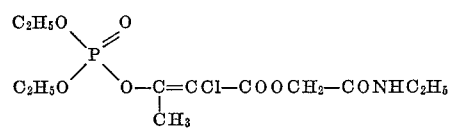

was prepared from triethyl phosphite and 2,2-dichloroacetoacetyl-glycolic acid ethylamide. The yield was 92% of theory.

*Analysis.*—Calculated: N, 3.92%. Found: N, 3.62%.

EXAMPLE 28

Using a procedure analogous to that described in Example 18, O,O-dimethyl-O-[1-(1-morpholinocarbonyl-ethoxycarbonyl)-1-propen-2-yl]-phosphate, a yellow oil, $n_D^{20}=1.4859$, of the formula

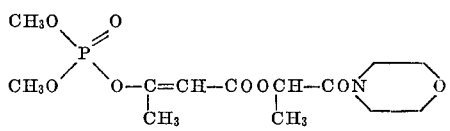

was prepared from trimethyl phosphite and 2-chloroacetoacetyl-lactic acid morpholide. The yield was 82% of theory.

*Analysis.*—Calculated: N, 3.98%. Found: N, 3.50%.

EXAMPLE 29

Using a procedure analogous to that described in Example 18, O,O-diethyl - O - [1-(1-morpholinocarbonylethoxycarbonyl)-1-propen-2-yl]-phosphate, a yellow oil, $n_D^{20}$=1.4748, of the formula

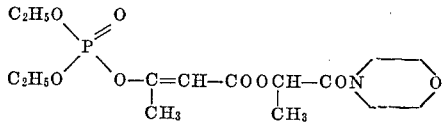

was prepared from triethyl phosphite and 2-chloroacetoacetyllactic acid morpholide. The yield was 73% of theory.

*Analysis.*—Calculated: N, 3.69%. Found: N, 3.40%.

EXAMPLE 30

Using a procedure analogous to that described in Example 18, O,O-dimethyl-O-[1-(diethylcarbamyl-methoxycarbonyl)-1-propen-2-yl]-phosphate, a dark red oil, $n_D^{20}$=1.4781, of the formula

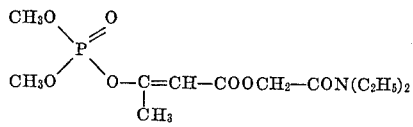

was prepared from trimethyl phosphite and 2-chloroacetoacetyl-glycolic acid diethylamide. The yield was 70% of theory.

*Analysis.*—Calculated: N, 4.33%. Found: N, 4.33%.

EXAMPLE 31

Using a procedure analogous to that described in Example 18, O,O-diethyl-O-[1-(diethylcarbamyl-methoxycarbonyl)-1-propen-2-yl]-phosphate, a dark red oil, $n_D^{20}$=1.4722, of the formula

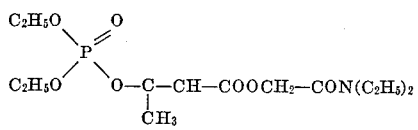

was prepared from triethyl phosphite and 2-chloroacetoacetyl-glycolic acid diethylamide. The yield was 57% of theory.

*Analysis.*—Calculated: N, 3.99%. Found: N, 3.90%.

EXAMPLE 32

Using a procedure analogous to that described in Example 18, O,O-dimethyl-O-[1-(1-morpholinocarbonylethoxy - carbonyl)-1-chloro-1-propen-2-yl]-phosphate, a red oil, $n_D^{20}$=1.4888, of the formula

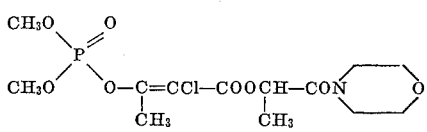

was prepared from trimethyl phosphite and 2,2-dichloroacetoacetyl-lactic acid morpholide. The yield was 64% of theory.

*Analysis.*—Calculated: N, 3.64%. Found: N, 3.15%.

EXAMPLE 33

Using a procedure analogous to that described in Example 18, O,O-dimethyl-O-[1-(1-morpholinocarbonylethoxy - carbonyl)-1-chloro-1-propen-2-yl]-phosphate, a dark red oil of the formula

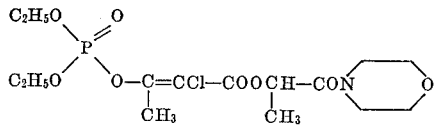

was prepared from triethyl phosphite and 2,2-dichloroacetoacetyl-lactic acid morpholide. The yield was 94% of theory.

*Analysis.*—Calculated: N, 3.36%. Found: N, 2.98%.

EXAMPLE 34

Using a procedure analogous to that described in Example 18, O,O - dimethyl - O - [1 - (dimethylcarbamyl-methoxy-carbonyl)-1-propen-2-yl]-phosphate, a dark red oil, $n_D^{20}$=1.4748, of the formula

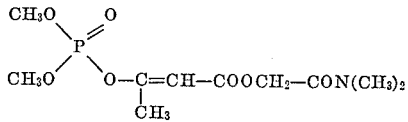

was prepared from trimethyl phosphite and 2-chloroacetoacetyl-glycolic acid dimethylamide. The yield was 64% of theory.

*Analysis.*—Calculated: N, 4.77%. Found: N, 4.80%.

EXAMPLE 35

Using a procedure analogous to that described in Example 18, O,O-diethyl-O-[1-(dimethylcarbamyl-methoxycarbonyl)-1-propen-2-yl]-phosphate, a dark red oil, $n_D^{20}$=1.4700, of the formula

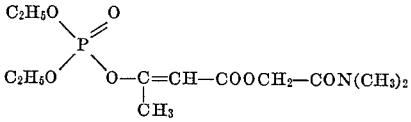

was prepared from triethyl phosphite and 2-chloroacetoacetyl-glycolic acid dimethylamide. The yield was 71% of theory.

*Analysis.*—Calculated: N, 4.35%. Found: N, 4.27%.

EXAMPLE 36

Using a procedure analogous to that described in Example 18, O,O-diethyl-O-[1-(methylcarbamyl-methoxycarbonyl) - 1 - propen - 2 - yl]-phosphate, a brown oil, $n_D^{20}$=1.4671, of the formula

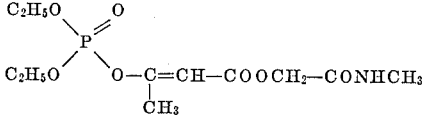

was prepared from triethyl phosphite and 2-chloroacetoacetyl-glycolic acid methylamide. The yield was 80% of theory.

*Analysis.*—Calculated: N, 4.63%. Found: N, 4.39%.

EXAMPLE 37

Using a procedure analogous to that described in Example 18, O,O-dimethyl-O-[1-(methylcarbamyl-methoxycarbonyl) - 1 - chloro-1-propen-2-yl]-phosphate, a dark brown oil of the formula

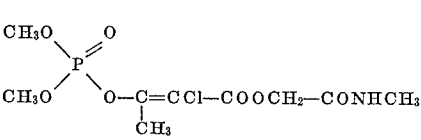

was prepared from trimethyl phosphite and 2,2-dichloroacetoacetyl-lactic acid methylamide. The yield was 70% of theory.

*Analysis.*—Calculated: N, 4.47%. Found: N, 4.50%.

EXAMPLE 38

Using a procedure analogous to that described in Example 18, O,O-diethyl-O-[1-(methylcarbamyl-methoxycarbonyl)-1-chloro-1-propen-2-yl]-phosphate, a dark oil of the formula $$\begin{array}{c} C_2H_5O \\ \phantom{C_2H_5O} \diagdown \phantom{xx} \diagup O \\ \phantom{xxxxx} P \\ \phantom{C_2H_5O} \diagup \phantom{xx} \diagdown \\ C_2H_5O \phantom{xxxxxxx} O-C=CCl-COOCH_2-CONHCH_3 \\ \phantom{xxxxxxxxxxxxxxxxx} | \\ \phantom{xxxxxxxxxxxxxxxxx} CH_3 \end{array}$$

was prepared from triethyl phosphite and 2,2-dichloroacetoacetyl-glycolic acid methylamide. The yield was 83% of theory.

*Analysis.*—Calculated: N, 4.07%. Found: N, 4.05%.

EXAMPLE 39

Using a procedure analogous to that described in Example 18, O,O-dimethyl-O-[1-(phenylcarbamyl-methoxycarbonyl)-1-propen-2-yl]-phosphate, a light yellow powder, M.P. 101–102° C. (recrystallized from benzene), of the formula $$\begin{array}{c} CH_3O \\ \phantom{CH_3O} \diagdown \phantom{xx} \diagup O \\ \phantom{xxxxx} P \\ \phantom{CH_3O} \diagup \phantom{xx} \diagdown \\ CH_3O \phantom{xxxxxxx} O-C=CH-COOCH_2-CONHC_6H_5 \\ \phantom{xxxxxxxxxxxxxxx} | \\ \phantom{xxxxxxxxxxxxxxx} CH_3 \end{array}$$

was prepared from trimethyl phosphite and 2-chloroacetoacetyl-glycolic acid phenylamide. The yield was 53% of theory.

*Analysis.*—Calculated: N, 4.08%; P, 9.04%. Found: N, 4.56%; P, 8.91%.

EXAMPLE 40

Using a procedure analogous to that described in Example 18, O,O-diethyl-O-[1-(phenylcarbamyl-methoxycarbonyl) - 1 - chloro-1-propen-2-yl]-phosphate, a light brown oil, $n_D^{20}$=1.5051, of the formula $$\begin{array}{c} C_2H_5O \\ \phantom{C_2H_5O} \diagdown \phantom{xx} \diagup O \\ \phantom{xxxxx} P \\ \phantom{C_2H_5O} \diagup \phantom{xx} \diagdown \\ C_2H_5O \phantom{xxxxxxx} O-C=CCl-COOCH_2-CONHC_6H_5 \\ \phantom{xxxxxxxxxxxxxxxxx} | \\ \phantom{xxxxxxxxxxxxxxxxx} CH_3 \end{array}$$

was prepared from triethyl phosphite and 2,2-dichloroacetoacetyl-glycolic acid phenylamide. The yield was 93% of theory.

*Analysis.*—Calculated: N, 3.45%; Cl, 8.76%. Found: N, 3.18%; Cl, 8.10%

EXAMPLE 41

Preparation of O,O-dimethyl-O-[1-(ethylcarbamyl-ethoxycarbonyl)-1-propen-2-yl]-phosphate 23.5 gm. (0.1 mol) of α-chloroacetoacetyl-lactic acid ethylamide were dissolved in 50 cc. of chlorobenzene, the solution was admixed with 16.1 gm. (0.13 mol) of trimethyl phosphite, and the mixture was stirred for three hours at 120° C. Thereafter, the reaction solution was evaporated in vacuo, the residue (30 gm.) was taken up in 200 cc. of water, and the solution was extracted with 20 cc. of petroleum ether. The petroleum ether extract solution was discarded, and the aqueous phase was treated with activated charcoal. The aqueous phase was then extracted several times with methylene chloride, the extract solutions were combined, and the combined solution was dried and evaporated. 19 gm. (61.4% of theory) of a yellow oil were obtained, which solidified upon prolonged standing at room temperature. It was identified to be O,O - dimethyl - O - [1-(ethylcarbamyl-ethoxycarbonyl)-1-propen-2-yl]-phosphate of the formula $$\begin{array}{c} CH_3O \\ \phantom{CH_3O} \diagdown \phantom{xx} \diagup O \\ \phantom{xxxxx} P \\ \phantom{CH_3O} \diagup \phantom{xx} \diagdown \\ CH_3O \phantom{xxxxxxx} O-C=CH-COOCH-CONHC_2H_5 \\ \phantom{xxxxxxxxxxxxxxx} | \phantom{xxxxxxx} | \\ \phantom{xxxxxxxxxxxxxxx} CH_3 \phantom{xxxxxx} CH_3 \end{array}$$

*Analysis* (mol. wt. 309.2).—Calculated: N, 4.51%; P, 10.0%. Found: N, 4.65%; P, 9.8%.

EXAMPLE 42

Using a procedure analogous to that described in Example 41, O,O - diethyl - O-[1-(ethylcarbamyl-ethoxycarbonyl) - 1 - propen - 2 - yl]-phosphate, a light yellow oil, $n_D^{20}$=1.4504, of the formula $$\begin{array}{c} C_2H_5O \\ \phantom{C_2H_5O} \diagdown \phantom{xx} \diagup O \\ \phantom{xxxxx} P \\ \phantom{C_2H_5O} \diagup \phantom{xx} \diagdown \\ C_2H_5O \phantom{xxxxxxx} O-C=CH-COOCH-CONHC_2H_5 \\ \phantom{xxxxxxxxxxxxxxxxx} | \phantom{xxxxxxx} | \\ \phantom{xxxxxxxxxxxxxxxxx} CH_3 \phantom{xxxxxx} CH_3 \end{array}$$

was prepared from triethyl phosphite and α-chloroacetoacetyl-lactic acid ethylamide. The yield was 88.7% of theory.

*Analysis.*—Calculated: N, 4.15%. Found: N, 3.80%.

EXAMPLE 43

Using a procedure analogous to that described in Example 41, O,O-dimethyl-O-[1-(ethylcarbamyl-ethoxycarbonyl) - 1 - chloro-1-propen-2-yl]-phosphate, a brown oil, $n_D^{20}$=1.4683, of the formula $$\begin{array}{c} CH_3O \\ \phantom{CH_3O} \diagdown \phantom{xx} \diagup O \\ \phantom{xxxxx} P \\ \phantom{CH_3O} \diagup \phantom{xx} \diagdown \\ CH_3O \phantom{xxxxxxx} O-C=CCl-COOCH-CONHC_2H_5 \\ \phantom{xxxxxxxxxxxxxxx} | \phantom{xxxxxxx} | \\ \phantom{xxxxxxxxxxxxxxx} CH_3 \phantom{xxxxxx} CH_3 \end{array}$$

was prepared from trimethyl phosphite and α,α-dichloroacetoacetyl-lactic acid ethylamide. The yield was 86.5% of theory.

*Analysis.*—Calculated: N, 4.08%. Found: N, 4.02%.

EXAMPLE 44

Using a procedure analogous to that described in Example 41, O,O - diethyl - O-[1-(ethylcarbamyl-ethoxycarbonyl) - 1 - chloro-1-propen-2-yl]-phosphate, a reddish-brown oil, $n_D^{20}$=1.4595, of the formula $$\begin{array}{c} C_2H_5O \\ \phantom{C_2H_5O} \diagdown \phantom{xx} \diagup O \\ \phantom{xxxxx} P \\ \phantom{C_2H_5O} \diagup \phantom{xx} \diagdown \\ C_2H_5O \phantom{xxxxxxx} O-C=CCl-COOCH-CONHC_2H_5 \\ \phantom{xxxxxxxxxxxxxxxxx} | \phantom{xxxxxxx} | \\ \phantom{xxxxxxxxxxxxxxxxx} CH_3 \phantom{xxxxxx} CH_3 \end{array}$$

was prepared from triethyl phosphite and α,α-dichloroacetoacetyl-lactic acid ethylamide. The yield was 94.4% of theory.

*Analysis.*—Calculated: N, 3.77%. Found: N, 3.41%.

EXAMPLE 45

Using a procedure analogous to that described in Example 41, O,O-dimethyl-O-[1-(piperidinocarbonyl-ethoxycarbonyl)-1-propen-2-yl]-phosphate, a light brown oil, $n_D^{20}$=1.4887, of the formula $$\begin{array}{c} CH_3O \\ \phantom{CH_3O} \diagdown \phantom{xx} \diagup O \\ \phantom{xxxxx} P \\ \phantom{CH_3O} \diagup \phantom{xx} \diagdown \\ CH_3O \phantom{xxxxxxx} O-C=CH-COOCH-CO-N\bigcirc \\ \phantom{xxxxxxxxxxxxxxx} | \phantom{xxxxxxx} | \\ \phantom{xxxxxxxxxxxxxxx} CH_3 \phantom{xxxxxx} CH_3 \end{array}$$

was prepared from trimethyl phosphite and α-chloroacetoacetyl-lactic acid piperidide. The yield was 90.3% of theory.

*Analysis.*—Calculated: N, 4.01%. Found: N, 4.05%.

EXAMPLE 46

Using a procedure analogous to that described in Example 41, O,O-dimethyl-O-[1-(isopropylcarbamyl-ethoxycarbonyl)-1-propen-2-yl]-phosphate, a brown oil, of the formula

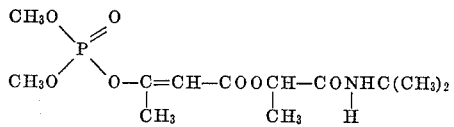

was prepared from trimethyl phosphite and α-chloroacetoacetyl-lactic acid isopropylamide. The yield was 92.1% of theory.

*Analysis.*—Calculated: N, 4.33%. Found: N, 4.23%.

EXAMPLE 47

Using a procedure analogous to that described in Example 41, O,O-dimethyl-O-[1-(methylcarbamyl-methoxycarbonyl)-1-propen-2-yl]-phosphate, a brown oil, $$n_D^{20} = 1.4752$$

of the formula

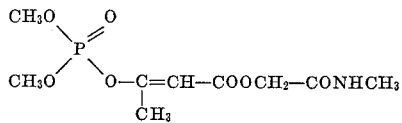

was prepared from trimethyl phosphite and α-chloroacetoacetyl-glycolic acid methylamide. The yield was 62% of theory.

*Analysis.*—Calculated: N, 4.97%. Found: N, 4.75%.

EXAMPLE 48

Using a procedure analogous to that described in Example 41, O,O-dimethyl-O-[1-(morpholinocarbonyl-ethoxycarbonyl)-1-propen-2-yl]-phosphate, a yellow oil, $$n_D^{20} = 1.4951$$

of the formula

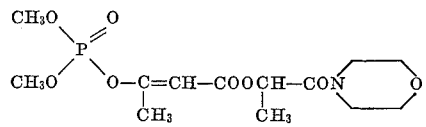

was prepared from trimethyl phosphite and α-chloroacetoacetyl-latic acid morpholide. The yield was 95% of theory.

*Analysis.*—Calculated: N, 4.56%. Found: N, 4.45%.

EXAMPLE 49

Preparation of O,O-dimethyl-O-[1-(1-cyano ethoxycarbonyl)-(1-propen-2-yl)-phosphate 22.8 gm. (0.12 mol) of α-chloroacetoacetyl-lactic acidnitrile were added dropwise, while stirring, to a boiling solution of 18.0 gm. (0.145 mol) of trimethyl phosphite in 75 cc. of chlorobenzene in a three-neck flask provided with a stirrer, dropping funnel and a reflux cooler, the latter in turn being connected to a cooled condenser trap. Altogether, the reaction solution was maintained at the reflux temperature for two hours. At the end of that time 6.0 gm. (calculated 6.6 gm.) of methyl chloride had collected in the trap. The reaction solution was then evaporated, and the residue was distilled in vacuo. The yellow liquid passing over between 138 and 140° C. at 0.04 mm. Hg was identified to be O,O-dimethyl-O-[1-(1-cyano-ethoxycarbonyl)-1-propen-2-yl]-phosphate of the formula

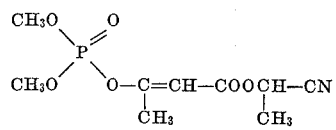

EXAMPLE 50

Using a procedure analogous to that described in Example 49, O,O-diethyl-O-[1 - (1 - cyano-ethoxycarbonyl)-1-propen-2-yl]-phosphate, B.P. 134–136° C. at 0.01 mm. Hg, of the formula

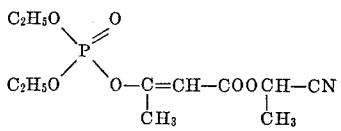

was prepared from triethyl phosphite and α-chloroacetoacetyl-lactic acid-nitrile. The yield was 71.5% of theory.

EXAMPLE 51

Using a procedure analogous to that described in Example 49, O,O-diethyl-O-[1-(cyano-methoxycarbonyl)-1-propen-2-yl]-phosphate, B.P. 155° C. at 0.02 mm. Hg, of the formula

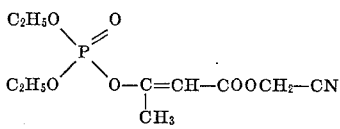

was prepared from triethyl phosphite and α-chloroacetoacetyl-glycolic acid-nitrile. The yield was 80.4% of theory.

EXAMPLE 52

Using a procedure analogous to that described in Example 49, O,O-dimethyl-O - [1 - (cyano-isopropoxycarbonyl)-1-propen-2-yl]-phosphate, B.P. 149–152° C. at 0.05 mm. Hg, of the formula

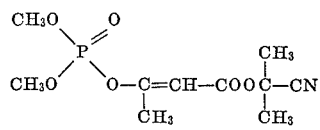

was prepared from trimethyl phosphite and α-chloroacetoacetyl-isobutyronitrile. The yield was 77.8% of theory.

The compounds according to the present invention, that is, those embraced by Formula I above, have useful properties. More particularly, they exhibit highly effective insecticidal and acaricidal properties, coupled with low toxicity toward warm-blooded animals and low volatility. The compounds are particularly effective against *Aphis fabae, Doralis fabae, Metatetranychus ulmi* and *Tetraanychus urticae*.

For insecticidal and acaricidal purposes the compounds of the instant invention are disseminated in customary fashion, that is, by spraying, dusting, brushing or the like, so that the insects and acarids intended to be killed come in direct contact with the compounds. The compounds may be used as such for this purpose or in admixture with inert gaseous, liquid or solid carriers. Examples of compositions consisting of one or more of the compounds according to the invention in admixture with an inert carrier are dusting powders, suspensions, emulsions, solutions, aerosols and the like. Such compositions may, in addition, contain other insecticidal and acaricidal agents as well as auxiliary components, such as emulsifiers, wetting agents and additives which enhance the ability of the composition to adhere to solid surfaces. The effective range of concentration of the compounds according to the invention in compositions of the type referred to above is between about 0.005 and about 5% by weight, based on the total weight of the composition.

The following examples illustrate a few insecticidal and acaricidal compositions comprising a compound of the instant invention as an active ingredient. The parts are parts by weight.

EXAMPLE 53

Emulsion 40 parts of O,O-dimethyl-O-[1-(1-ethoxycarbonyl-ethoxycarbonyl)-1-propen-2-yl]-phosphate were admixed with 20 parts of xylene and 40 parts of naphthalene sulfonate, and the mixture was emulsified in a sufficient amount of water to make the concentration of the phosphate compound in the finished emulsion from 0.01 to 0.2% by weight. The resulting aqueous emulsion was a highly effective insecticidal and acaricidal composition particularly adapted for dissemination by spraying.

EXAMPLE 54

Suspension 25 parts of O,O-dimethyl-O-[1-(1-methoxycarbonyl-ethoxycarbonyl)-1-propen-2-yl]-phosphate were admixed with five parts of naphthalene sulfonate and 20 parts of kaolin, the mixture was milled, and the resulting wettable powder was suspended in a sufficient amount of water to make the concentration of the phosphate compound in the aqueous suspension from 0.01 to 0.2% by weight. The suspension was a highly effective insecticidal and acaricidal composition particularly adapted for dissemination by spraying or brushing.

EXAMPLE 55

Dusting powder 2 parts of O,O-diethyl-O-[1-(1-methoxycarbonyl-ethoxycarbonyl)-1-propen-2-yl]-phosphate were admixed with 98 parts of kaolin, and the mixture was milled into a homogeneous powder. The powder was a highly effective insecticidal and acaricidal composition.

EXAMPLE 56

Aerosol spray 5 parts of O,O-dimethyl-O-[1-(1-isopropoxycarbonyl-ethoxycarbonyl)-1-propen-2-yl]-phosphate were dissolved in 95 parts of difluoro-dichloro-methane, and the solution was charged into a conventional pressurized aerosol can provided with an aerosol spray valve. The aerosol was a highly effective insecticidal and acaricidal composition.

Although Examples 53 through 56 illustrative only four specific compounds of the present invention as active ingredients in various insecticidal and acaricidal compositions, it should be understood that any other compound embraced by Formula I above may be substituted for the particular phosphate compounds in these examples.

We claim:
1. A compound of the formula

$$\begin{array}{c} R_1O \\ \diagdown \\ R_2O \end{array} \!\! P \!\! \begin{array}{c} O \\ \diagup \\ \diagdown O-C=C-COO-CH-COOR_7 \\ \phantom{xxxx} | \phantom{xxxxxx} | \\ \phantom{xxxx} CH_3 \phantom{xxxx} R_4 \end{array}$$
$$\phantom{xxxxxxxxxxx} R_3$$

wherein
$R_1$ and $R_2$ are each alkyl of 1 to 4 carbon atoms,
$R_3$ is hydrogen, chlorine or bromine,
$R_4$ is hydrogen or methyl, and
$R_7$ is alkyl of 1 to 6 carbon atoms.

2. A compound of the formula $$\begin{array}{c} R_1O \\ \diagdown \\ R_2O \end{array} \!\! P \!\! \begin{array}{c} O \\ \diagup \\ \diagdown O-C=C-COO-CH-COOR_7 \\ \phantom{xxxx} | \phantom{xxxxxx} | \\ \phantom{xxxx} CH_3 \phantom{xxxx} R_4 \end{array}$$
$$\phantom{xxxxxxxxxxx} R_3$$

wherein
$R_1$ and $R_2$ are methyl or ethyl,
$R_3$ is hydrogen, chlorine or bromine,
$R_4$ is hydrogen or methyl, and
$R_7$ is alkyl of 1 to 4 carbon atoms.

3. A compound according to claim 1, wherein $R_1$ and $R_2$ are methyl, $R_3$ is hydrogen, $R_4$ is methyl and $R_7$ is ethyl.

4. A compound according to claim 1, wherein $R_1$, $R_2$, $R_4$ and $R_7$ are methyl and $R_3$ is hydrogen.

5. A compound according to claim 1, wherein $R_1$ and $R_1$ and $R_2$ are ethyl, $R_3$ is hydrogen and $R_4$ and $R_7$ are methyl.

6. A compound according to claim 1, wherein $R_1$, $R_2$ and $R_4$ are methyl, $R_3$ is hydrogen and $R_7$ is isopropyl.

References Cited

UNITED STATES PATENTS 3,196,190   7/1965   Nischk et al. _____ 260—942

FOREIGN PATENTS 867,780   5/1961   Great Britain.

ALEX MAZEL, Primary Examiner

J. H. TURNIPSEED, Assistant Examiner

U.S. Cl. X.R.

260—247.2, 294.3, 938, 940, 941, 943; 424—200, 210, 211, 212

PO-1050
(5/69)

UNITED STATES PATENT OFFICE
CERTIFICATE OF CORRECTION

Patent No. 3,506,743         Dated April 14, 1970

Inventor(s) Wolfgang Buck, Richard Sehring and Karl Zeile

It is certified that error appears in the above-identified patent and that said Letters Patent are hereby corrected as shown below:

Col. 3, line 39: after "94.4" insert --%--;
       line 44: "2-propen" should read --1-propen--; insert --]-- after "yl".

Col. 5, line 47: before "of theory" insert --acetyl-lactic acid isopropyl ester. The yield was 94.6%--.

Col. 7, line 32: "1,4680" should read --1.4680--

Col. 8, first formula: "S" should read --P--.

Col. 9, line 75: "dimethyl" should read --diethyl--.

Col. 16, line 30: delete "$R_1$ and".

Signed and sealed this 1st day of September 1970.

(SEAL)
Attest:

EDWARD M. FLETCHER, JR.         WILLIAM E. SCHUYLER, JR.
Attesting Officer               Commissioner of Patents